(12) United States Patent
Kruglick et al.

(10) Patent No.: US 7,418,712 B2
(45) Date of Patent: *Aug. 26, 2008

(54) METHOD AND SYSTEM TO SUPPORT MULTIPLE-PROTOCOL PROCESSING WITHIN WORKER PROCESSES

(75) Inventors: Emily Kruglick, Sammamish, WA (US); Geoffrey M. Kizer, Seattle, WA (US); Shai Kariv, Bellevue, WA (US); Lance E. Olson, Sammamish, WA (US); Erik B. Christensen, Seattle, WA (US); Kenneth D. Wolf, Seattle, WA (US); Dmitry Robsman, Bellevue, WA (US); Shanku Shivabrata Niyogi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

This patent is subject to a terminal disclaimer.

(21) Appl. No.: 10/931,437

(22) Filed: Aug. 31, 2004

(65) Prior Publication Data

US 2006/0047818 A1 Mar. 2, 2006

(51) Int. Cl.
G06F 3/00 (2006.01)
G06F 9/44 (2006.01)
G06F 9/46 (2006.01)
G06F 13/00 (2006.01)

(52) U.S. Cl. .................................. 719/314; 709/230
(58) Field of Classification Search ................ 719/330, 719/313, 314; 709/230
See application file for complete search history.

(56) References Cited

U.S. PATENT DOCUMENTS

| | | | |
|---|---|---|---|
| 5,146,593 | A | 9/1992 | Brandle et al. |
| 5,155,837 | A | 10/1992 | Liu et al. |
| 5,535,322 | A | 7/1996 | Hecht |
| 5,590,266 | A | 12/1996 | Carson et al. |
| 5,706,507 | A | 1/1998 | Schloss |
| 5,715,386 | A | 2/1998 | Fulton, III et al. |
| 5,845,280 | A | 12/1998 | Treadwell, III et al. |
| 5,878,408 | A | 3/1999 | Van Huben et al. |
| 5,918,226 | A | 6/1999 | Tarumi et al. |
| 5,920,867 | A | 7/1999 | Van Huben et al. |

(Continued)

OTHER PUBLICATIONS

Reis, R. Q., "Dynamic Software Process Manager for the PROSOFT Software Engineering Environment", SoST98': Symposium on Software Technology Process Improvement: Putting Software Environment to Work, pp. 197-202, Sep. 1998.

(Continued)

*Primary Examiner*—Meng-Ai An
*Assistant Examiner*—KimbleAnn Verdi
(74) *Attorney, Agent, or Firm*—Lee & Hayes, PLLC

(57) ABSTRACT

A server system has a process manager, listeners and worker processes in which the listeners connect to worker processes. At server start-up, each listener connects with the process manager via a pipe published by the process manager. The process manager then provides information to each listener associating applications to application pools, and applications for which the listener is to "listen". When the listener receives a request for which it is to listen, the listener starts a queue for the application or associated application pool. The process manager launches an appropriate worker process to handle requests in the listener's protocol. The worker process then makes a connection with the listener.

24 Claims, 8 Drawing Sheets

U.S. PATENT DOCUMENTS

| | | | |
|---|---|---|---|
| 5,920,873 | A | 7/1999 | Van Huben et al. |
| 5,928,323 | A | 7/1999 | Gosling et al. |
| 5,930,830 | A | 7/1999 | Mendelson et al. |
| 6,023,702 | A | 2/2000 | Leisten et al. |
| 6,067,580 | A * | 5/2000 | Aman et al. ............... 719/330 |
| 6,094,654 | A | 7/2000 | Van Huben et al. |
| 6,098,064 | A | 8/2000 | Pirolli et al. |
| 6,112,196 | A * | 8/2000 | Zimowski et al. .............. 707/2 |
| 6,157,959 | A | 12/2000 | Bonham et al. |
| 6,188,698 | B1 | 2/2001 | Galand et al. |
| 6,209,018 | B1 * | 3/2001 | Ben-Shachar et al. ........ 718/105 |
| 6,212,573 | B1 * | 4/2001 | Lim et al. ................... 719/315 |
| 6,219,760 | B1 | 4/2001 | McMinn |
| 6,223,202 | B1 | 4/2001 | Bayeh |
| 6,223,207 | B1 | 4/2001 | Lucovsky et al. |
| 6,289,458 | B1 | 9/2001 | Garg et al. |
| 6,327,594 | B1 | 12/2001 | Van Huben et al. |
| 6,339,771 | B1 * | 1/2002 | Zimowski et al. .............. 707/2 |
| 6,389,421 | B1 | 5/2002 | Hawkins et al. |
| 6,463,465 | B1 | 10/2002 | Nieuwejaar |
| 6,542,920 | B1 * | 4/2003 | Belkin et al. ................ 718/104 |
| 6,574,712 | B1 | 6/2003 | Kahle et al. |
| 6,594,784 | B1 | 7/2003 | Harper et al. |
| 6,604,106 | B1 | 8/2003 | Bodin et al. |
| 6,622,168 | B1 | 9/2003 | Datta |
| 6,629,266 | B1 | 9/2003 | Harper et al. |
| 6,636,900 | B2 * | 10/2003 | Abdelnur .................... 719/316 |
| 6,671,716 | B1 * | 12/2003 | Diedrichsen et al. ......... 709/203 |
| 6,732,138 | B1 | 5/2004 | Browning et al. |
| 6,792,611 | B2 | 9/2004 | Honishi et al. |
| 6,810,495 | B2 | 10/2004 | Castelli et al. |
| 6,820,215 | B2 | 11/2004 | Harper et al. |
| 6,915,384 | B2 | 7/2005 | Mitra et al. |
| 6,941,379 | B1 * | 9/2005 | Dingsor et al. .............. 709/235 |
| 6,978,398 | B2 | 12/2005 | Harper et al. |
| 6,990,513 | B2 | 1/2006 | Belfiore et al. |
| 7,028,091 | B1 | 4/2006 | Tripathi et al. |
| 7,028,312 | B1 * | 4/2006 | Merrick et al. .............. 719/330 |
| 7,107,329 | B1 * | 9/2006 | Schroder et al. ............. 709/221 |
| 7,257,819 | B1 * | 8/2007 | Dixon et al. ................ 719/316 |
| 7,330,483 | B1 * | 2/2008 | Peters et al. ................ 370/466 |
| 7,356,803 | B2 * | 4/2008 | Bau et al. ................... 717/116 |
| 2001/0010053 | A1 * | 7/2001 | Ben-Shachar et al. ........ 709/105 |
| 2002/0047899 | A1 | 4/2002 | Son et al. |
| 2002/0059425 | A1 * | 5/2002 | Belfiore et al. .............. 709/226 |
| 2002/0062372 | A1 | 5/2002 | Hong et al. |
| 2002/0065900 | A1 * | 5/2002 | Dor et al. ................... 709/217 |
| 2002/0069420 | A1 | 6/2002 | Russell et al. |
| 2002/0073132 | A1 * | 6/2002 | Van Garderen et al. ...... 709/102 |
| 2002/0078174 | A1 | 6/2002 | Sim et al. |
| 2002/0083214 | A1 * | 6/2002 | Heisig et al. ................ 709/315 |
| 2002/0087612 | A1 | 7/2002 | Harper et al. |
| 2002/0087797 | A1 | 7/2002 | Adrangi |
| 2002/0120710 | A1 | 8/2002 | Chintalapati et al. |
| 2002/0129123 | A1 | 9/2002 | Johnson et al. |
| 2002/0147823 | A1 * | 10/2002 | Healy ......................... 709/230 |
| 2002/0147966 | A1 | 10/2002 | Frazier |
| 2002/0152328 | A1 | 10/2002 | Kagan et al. |
| 2002/0161908 | A1 | 10/2002 | Benitez et al. |
| 2003/0005122 | A1 | 1/2003 | Freimuth et al. |
| 2003/0005181 | A1 * | 1/2003 | Bau et al. ................... 709/330 |
| 2003/0023957 | A1 * | 1/2003 | Bau et al. ................... 717/140 |
| 2003/0061378 | A1 | 3/2003 | Mazzitelli |
| 2003/0079154 | A1 * | 4/2003 | Park et al. |
| 2003/0084018 | A1 * | 5/2003 | Chintalapati et al. ........... 707/1 |
| 2003/0135464 | A1 | 7/2003 | Mourad et al. |
| 2003/0135542 | A1 * | 7/2003 | Boudreau .................... 709/203 |
| 2003/0182400 | A1 * | 9/2003 | Karagounis et al. ......... 709/219 |
| 2004/0068479 | A1 * | 4/2004 | Wolfson et al. ................ 707/1 |
| 2004/0205048 | A1 * | 10/2004 | Pizzo et al. .................... 707/3 |
| 2004/0205769 | A1 * | 10/2004 | Ruutu ........................ 719/313 |
| 2005/0021689 | A1 * | 1/2005 | Marvin et al. ............... 709/220 |
| 2005/0235290 | A1 * | 10/2005 | Jefferson et al. ............. 719/310 |
| 2005/0246415 | A1 | 11/2005 | Belfiore et al. |
| 2007/0078995 | A1 * | 4/2007 | Benard et al. ............... 709/230 |
| 2007/0199001 | A1 * | 8/2007 | Grasso ........................ 719/330 |
| 2007/0204279 | A1 * | 8/2007 | Warshavsky et al. ......... 719/330 |

OTHER PUBLICATIONS

Hunt, G.D.H., "Network Dispatcher: A Connection Router for Scalable Internet Services", Computer Networks and ISDN Systems Conference Title: Comput. Netw. ISDN Syst., vol. 30, No. 1-7, pp. 347-357, Apr. 1998.

Saslgarelli, L., "Supporting IP Multicast Integrated Services in ATM Networks", Broadband Networking Technologies, pp. 78-88, Nov. 1997.

Donnelly, P., "Writing IIS Applications in Dyalog APL", APL Quote Quad, vol. 33, No. 1, pp. 13-17, Sep. 1990.

Alexandrov, I et al., "Process Management Inside Atlas Daq", IEEE Transactions on Nuclear Science, vol. 49, No. 5, pp. 2459-2462, Oct. 2002.

Fitzpatrick, M., "The IRAF Client Display Library (CDL)", vol. 145, pp. 200-203, Astronomical Society of the Pacific Conference Series Conference, Sep. 1997.

Canosa, M., "Extensions to the MARS Model for IP Integrated Services over ATM Networks", Internet Routing and Quality of Service, pp. 132-142, Nov. 1998.

Shim, Jae-Hong, "Mike: Real-Time Microkernel Supporting Monitor Concept", Hanguk Chongbo Kwahakhoe Chi = Journal of the Korean Information Science Society, vol. 25, No. 2, pp. 166-176, Feb. 1998.

Chen, Q. "How Agents from Different E-Commerce Enterprises Cooperate", Proceedings 5th International Symposiumo n Autonomous Decentralized Systems, pp. 341-348, Mar. 2001.

Tanaka, M., "A File Service Mechanism for Distributed Systems", Quarterly Reports Railway Technical Research Institute, vol. 31, No. 3, pp. 160-164, Sep. 1990.

Caucho Servlet Engine on Apache Unix, Mar. 12, 2008 at <<http://web.archive.org/web/2001040144529/caucho.com/products/resin/ref/cs3-apache-unix.xtp>>, Caucho, 1998-2001, pp. 1-6.

Li et al., "An Approach for Estimation of Software Aging in a Web Server", IEEE, Proceedings of the 2002 International Symposium on Empirical Software Engineering, 2002, 10 pgs.

Mercer et al., "Processor Capacity Reserves: An Abstraction for Managing Processor Usage", Workstation Operating Systems, 1993. Proceedings. Fourth Workshop on Oct. 14-15, 1993, pp. 129-134.

Tanenbaum, "Structured Computer Organization", Prentice-Hall Inc, 1984, pp. 10-12.

"Web Application: Servlets and Filters" retrieved at <<http://www.caucho.com/resin-3.0/config/webapp.xtp>> on Mar. 12, 2008, Caucho Technologies Inc, 21 pgs.

Zhou et al., "Processor Pool-Based Scheduling for Large-Scale NUMA Multiprocessors", Joint International Conference on Measurement and Modeling of Computer Systems, ACM, 1991, pp. 133-142.

* cited by examiner

METHOD AND SYSTEM TO SUPPORT MULTIPLE-PROTOCOL PROCESSING WITHIN WORKER PROCESSES

CROSS-REFERENCE TO RELATED APPLICATIONS

This application is related to co-filed and commonly assigned U.S. patent application Ser. No. 10/931,600 entitled "Method And System To Support A Unified Process Model For Handling Messages Sent In Different Protocols" and to co-filed and commonly assigned U.S. patent application Ser. No. 10/931,349 entitled "URL Namespace to Support Multiple-Protocol Processing within Worker Processes".

This application is also related to co-pending and commonly assigned U.S. patent application Ser. No. 09/878,950 entitled "Methods and Arrangements for Routing Server Requests to Worker Processes Based on URL" filed on Jun. 11, 2001; U.S. patent application Ser. No. 10/377,175 entitled "An Improved Web Server Architecture" filed Feb. 28, 2003; U.S. patent application Ser. No. 10/377,148 entitled "Ensuring the Health and Availability of Web Applications" filed Feb. 28, 2003; and U.S. patent application Ser. No. 10/377,176 entitled "Web Garden Application Pools Having a Plurality of User-Mode Web Applications" filed Feb. 28, 2003.

FIELD

Various embodiments described below relate generally to computers and like devices, and more particularly but not exclusively to servers. Still more particularly, various embodiments relate to connections to worker processes running on servers.

BACKGROUND

The popularity of the Internet, and in particular, the portion of the Internet known as the World Wide Web, continues to grow. The World Wide Web is basically a collection of computers that are operatively linked together through a plurality of communication networks. Typically, users access the World Wide Web through a personal computer or like device, which is connected to the Internet via a modem of some type. For example, many users of the World Wide Web connect to the Internet using a dial-up telephone networked modem configured to establish data communications through an Internet Services Provider (ISP). Other users connect to the Internet with a faster modem, e.g., a cable modem, digital subscriber line (DSL) modem, etc.

Regardless of how a user ultimately connects to the Internet/World Wide Web, once connected the user typically accesses information available therein by using a web browser or like application. A web browser is configured to access web pages that are provided through the Internet by other computers. For example, one or more web server computers may be connected to the Internet and configured with one or more web sites or other supporting web applications. A web site typically has one or more static web pages and/or is capable of supplying one or more dynamically generated web pages that the user may selectively download, view and possible interact with.

To identify a particular web site/page the user will typically select a hyper link to the desired web site/page or may choose to manually enter a unique name for the web site/page. The most common name used for identifying a web site/page is known as the uniform resource locator (URL). For example, by entering a URL, the user will be connected to an appropriate web server which hosts the applicable web application(s), and the requested web page will be downloaded using a hypertext transfer protocol (HTTP) to the web browser. Within the Internet itself, the selected URL is associated with a specific Internet Protocol (IP) address. This IP address takes the form of a unique numerical identifier, which has been assigned to the targeted web server. Thus, a user may also directly enter an IP address in the web browser. However, the majority of users tend to favor the use of the more easily remembered and entered URL.

When a typical web server receives a request, e.g., an HTTP request, from a web browser, it needs to handle the request. Hence, a web server process may be configured to handle the request itself, or may need to pass the request on to another process, e.g., a worker process, that is configured to handle the request. Conventional web server processes typically listen to a particular port (e.g., "port 80") provided by a Transmission Control Protocol/Internet Protocol (TCP/IP) kernel-mode provided service. When a request is received, the web server process either handles the request or calls for a worker process to handle the request. To determine which worker process should handle the request, most conventional web server processes either map the request to a physical file or to a dynamic application of some sort, such as a dynamic-linked library (DLL) or common gateway interface (CGI) process. Mapping is typically based on the extension provided at the end of the URL. For example, an ".html" extension signifies that the desired web page is in a HyperText Markup Language format. This extension could then be found, for example, in a look-up table, and associated with a specific worker process, if needed. Conversely, the .html extension may identify that the web server process can handle the request itself. There exists a plurality of extensions that may be used to identify the applicable worker process.

Once a specific worker process has been identified, the worker process is started (as needed) and the request is forwarded to the worker process. Such decisions and subsequent routing of the request are conducted by user-mode processes.

Conventional web servers typically incur a delay associated with such user-node "process hops". For such web servers, which often receive thousands of requests each minute, the delays associated with process hops can diminish the efficiency of the web server. In certain configurations, the web server process may be required to share a common communication port with one or more worker processes. This too may further reduce the efficiency of the web server. In addition, there can be a reduction in the robustness of the web server in certain situations, e.g., when a worker process fails to receive/complete the request, etc.

SUMMARY

According to aspects of the various embodiments, methods and systems are provided for connecting services (e.g., listener services) with worker processes to handle requests in multiple protocols. In one aspect, a system includes a server having a process manager and one or more listeners, and multiple clients that request services from the server. The process manager launches worker processes to handle the service requests from the clients. In this aspect, each listener receives requests in a specified protocol, with different listeners processing different protocols so that multiple protocols are supported.

In this aspect, at start-up of the server, the process manager connects to each listener. For example, the process manager can connect to a listener via a pipe published by the process manager. The process manager then loads information into each listener, which the listener uses in receiving requests. The information includes notification of which application(s) the listener is to listen for when receiving requests, and associations (e.g., mappings) between applications and application pools. In one embodiment, an application pool is a collection of applications that all route to the same set of worker processes. When the listener receives a request for an application for which it is listening, the listener starts a queue for that application and signals the process manager to launch a worker process to handle the request. The worker process includes at least one protocol handler. A protocol handler is a component that supports sending/receiving of messages in a particular protocol (e.g., a protocol handler for the listener's protocol in this case).

The multiple protocol support by the listeners and worker processes advantageously increases the flexibility of the server in handling various requests from clients.

In another aspect, the process handler connects to the listeners in a "first to detect" process. For example, in an embodiment in which a pipe is used, the first listener to detect the pipe published by the process manager can connect to the pipe. The process manager continues to publish pipes for the listeners to connect. This aspect provides a flexible and complete mechanism to connect all of the listeners to the process manager in preparation for connecting listeners with worker processes in response to server requests received from clients.

In still another aspect, a process manager can configure a listener to route requests for all applications of an application pool to a single queue in a worker process instead of routing to a queue per application.

In yet another aspect, the process manager can cause a listener to disable either existing application(s) or application pool(s), thus causing the listener to not process requests sent for a specific application (or any request sent to any application in a specific application pool in the case of a disabled application pool)

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

The following techniques and mechanisms are directed to implementing methods and systems for establishing connections between listeners and worker processes to support handling of requests in different protocols. Generally stated, a service (e.g., a listener) connects with a process manager via a pipe published by the process manager. When the listener receives a request, it starts an internal queue corresponding to that request and signals (e.g., send a message or make a call) the process manager to launch a worker process to handle the request. In signaling the process manager, the listener effectively indicates the protocol of the request. For example, in one embodiment, each listener has registered the protocol it handles with the process manager during an installation process and, thus, inherently indicates the request's protocol when it sends the message to the process manager. The process manager launches the worker process with an appropriate protocol handler so that the worker process can correctly handle the requests. The worker process then makes a connection with the listener and pulls requests from the listener's internal queue. Specific implementations of this general concept are described below.

General Overview of System

Figure 1:
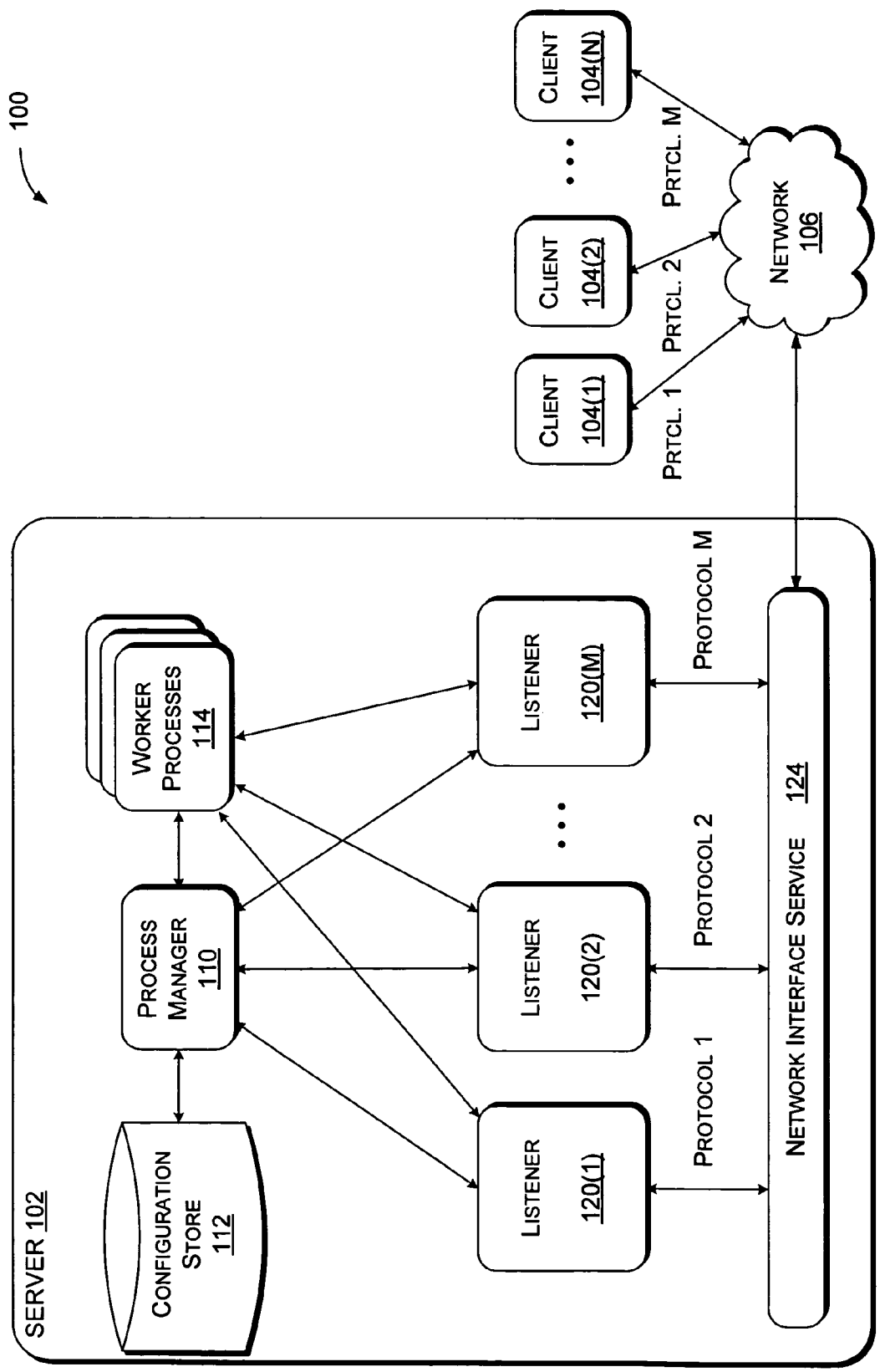
FIG. 1 is a functional block diagram illustrating a client-server system having listeners supporting multiple protocols, according to one embodiment.

FIG. 1 illustrates a client-server system 100 having multiple listeners that each support processing of requests in a preselected protocol, according to one embodiment. In this embodiment, system 100 includes a server 102, clients 104(1)-104(N), and a network 106 over which server 102 and clients 104(1)-104(N) communicate. Further, during typical operation, server 102 includes a process manager 110, a configuration store 112, worker processes 114 and listeners 120(1)-120(M) in this embodiment. In some embodiments, each listener includes a listener adapter (not shown) and a listener component (not shown). In other embodiments, the listener adapter and the listener component are separate components and can be in separate processes. For each listener, the listener adapter exchanges information with process manager 110 and configures the listener component based on information received from process manager 110. Server 102, in this embodiment, also includes a network interface service 124. In one embodiment, network interface service 124 is implemented as a TCP/IP kernel mode service.

In addition to describing methods and systems to establish connections between listeners and worker processes to support requests in multiple protocols, the general operation of system 100 is described below to facilitate understanding of the operation of the various embodiments.

In this exemplary embodiment, system 100 is used to service requests in various protocols sent by clients 104(1)-104(N) via network 106 for web services provided by server 102. In some embodiments, listeners 120(1)-120(M) and worker processes 114 are implemented as disclosed in the aforementioned co-filed and commonly assigned U.S. patent application Ser. Nos. 10/931,349 and 10/931,600, although in other embodiments these components may be implemented differently. Each of these elements is generally described below.

Configuration store 112 is used to store information about the configuration of server 102 to allow for associations to be made between applications (which can include sites/pages/ services provided by server 102) and application pools. For example, configuration store 112 may define multiple application pools (as previously mentioned, an application pool is a collection of applications that all route to the same set of worker processes). In one embodiment, process manager 110 uses information in configuration store 112 to configure listeners 120(1)-120(M) to listen for application URIs and identify appropriate application pools for servicing the requests based on the application URIs. Configuration store 112 may be updated by an administrator.

Process manager 110 generally operates to configure listeners 120(1)-120(M), and to launch and manage worker processes 114 in response to requests received by listeners 120(1)-120(M) from clients 104(1)-104(N). For example, process manager 110 can configure listeners 120(1)-120(M) using information from configuration store 112. In other embodiments, process manager 110 may configure listeners using information obtained in other ways.

Listeners, after being configured by process manager 110, operate to receive service requests from clients 104(1)-104(N) and support communication between the clients and worker processes 114. For example, in one embodiment, a listener examines a received request to identify an appropriate application pool, as described in the aforementioned U.S. patent application Ser. No. 10/931,349. Each listener supports a specific protocol so that together, the listeners support handling of requests in multiple protocols.

Worker processes 114 handle requests, which can originate from clients in multiple protocols. As previously described, worker processes 114 are launched by process manager 110 in response to requests received by listeners 120(1)-120(M). Inside worker processes 114, protocol handlers are loaded to connect with listeners 120(1)-120(M) to route requests to the appropriate application in the worker process for servicing. A worker process can support more than one protocol. In this embodiment, each of the worker processes is supported by a private (non-shared) interface with a listener.

Network interface service 124 provides services to support communication over network 106. In a typical embodiment, network interface service 124 provides support for TCP/IP communication over network 106. In other embodiments in which network 106 uses a different protocol, network interface service 124 would be configured to provide support for this other protocol.

Figure 2:
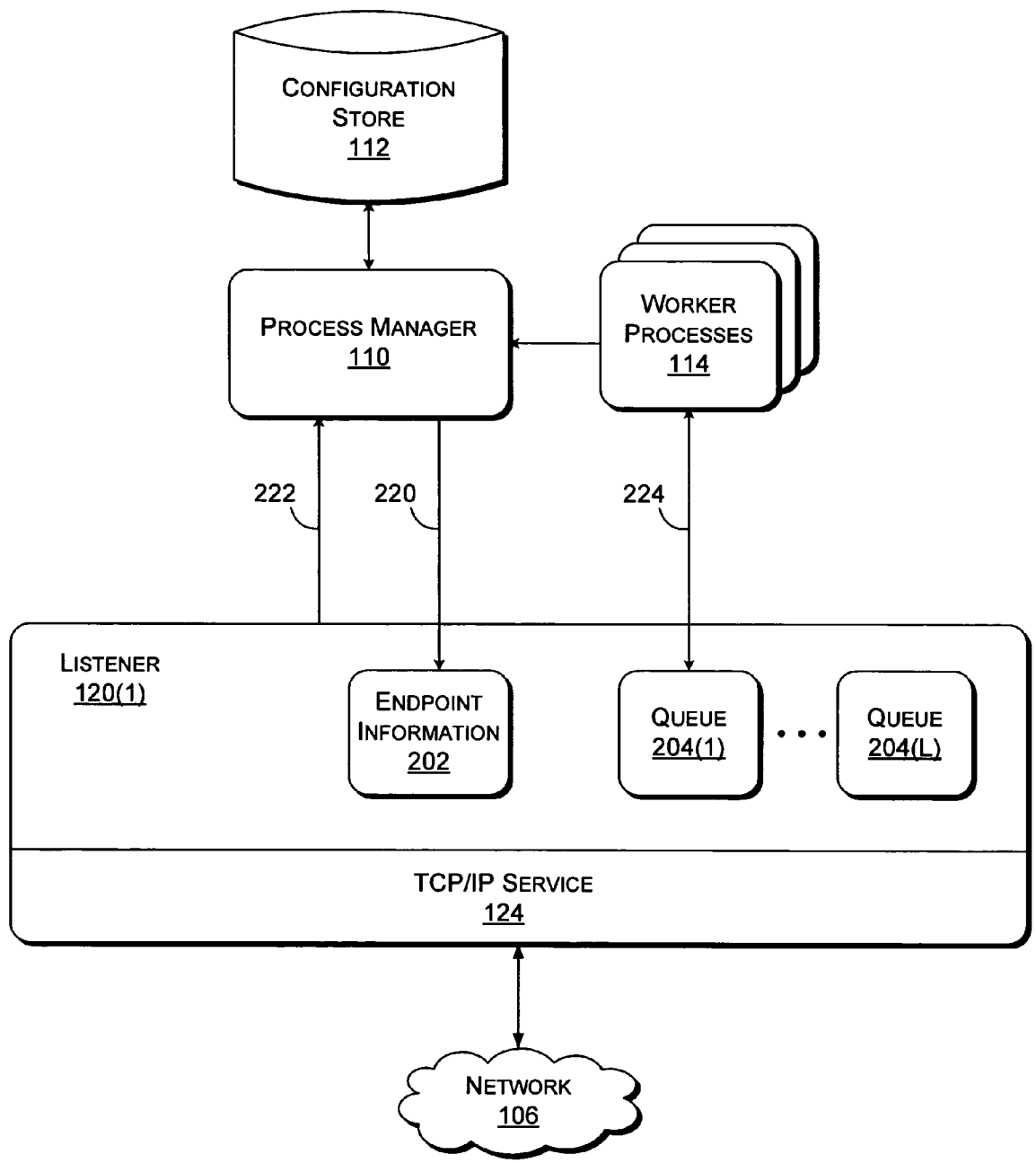
FIG. 2 is a functional block diagram illustrating a single listener in more detail, according to one embodiment.

FIG. 2 illustrates an embodiment of listener 120(1) in more detail, which can also apply to listeners 120(2)-120(M). This embodiment of listener 120(1) includes endpoint information 202, and queues 204(1)-204(L). In addition, network interface service 124 (FIG. 1) is implemented as a TCP/IP service in this embodiment.

In this embodiment, endpoint information 202 is obtained from configuration store 112 via process manager 110 as indicated by an arrow 220. As previously described, endpoint information 202 can include information for configuring listener 120(1) to listen for one or more particular applications when receiving requests. In addition, endpoint information 202 can include information for associating detected applications to appropriate application pools. For example, one such association may map multiple applications (also referred to herein as a binding) to a particular application pool.

Queues 204(1)-204(L) are created by listener 120(1) in response to requests received from clients (see FIG. 1) via network 106. For example, after receiving a request, listener 120(1) can identify an application pool associated with an application in the request using endpoint information 202 and then create a new queue for the identified application pool. The listener can then route the request to this internal queue.

Listener 120(1) may also route received requests to existing queues. For example, if listener 120(1) receives a request that references an application that is mapped to an application pool for which a queue has already been created, then listener 120(1) will route that request to that existing queue.

Figure 3:
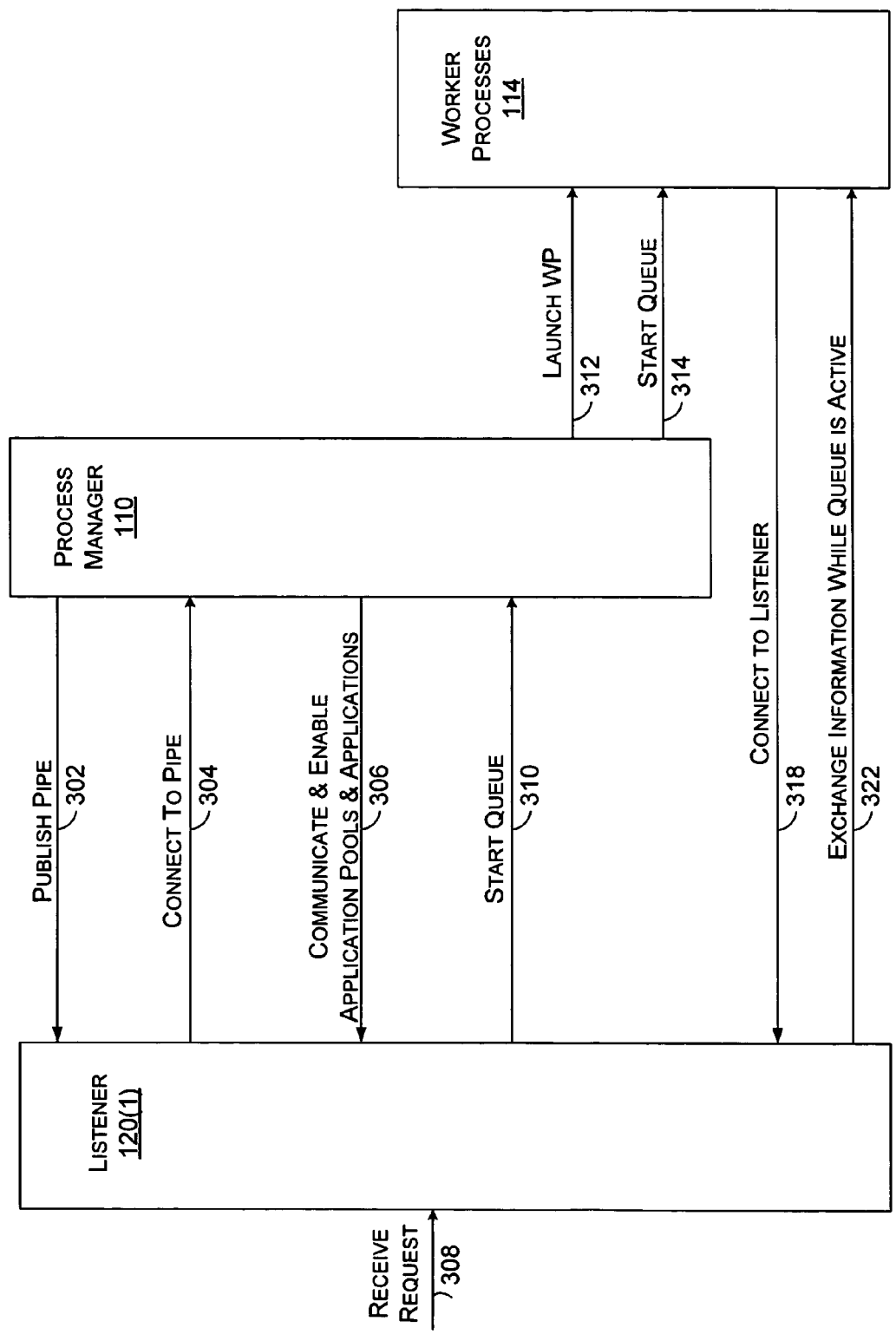
FIG. 3 is a diagram generally illustrating sequence of events in establishing and using a connection between a listener and a worker process, according to one embodiment.

FIG. 3 illustrates a sequence of operations that occur in establishing and using a connection between listener 120(1) and one of worker processes 114 to handle a request received in one of the supported multiple protocols, according to one embodiment. This sequence can also apply to listeners 120(2)-120(M). Referring to FIGS. 2 and 3, a connection is established between listener 120(1) and one of worker processes 114 according to one embodiment as follows.

At an initialization phase of server 102 (FIG. 1), process manager 110 publishes a pipe so that all listeners (that have not yet connected to such a pipe) can attempt to connect to the pipe. In this example, listener 120(1) is the first to detect the published pipe. This operation is represented by an arrow 302 in FIG. 3. As previously described, each listener supports a particular protocol, so that together listeners 120(1)-120(M) support client-server communication in multiple protocols.

In response, listener 120(1) connects to the pipe. This pipe connection is indicated by an arrow 220 in FIG. 2. Other listeners that have not yet connected to a pipe that was published by process manager 110 then have to wait for process manager 110 to publish the next pipe and attempt to connect. This operation is represented by an arrow 304 in FIG. 3.

Once listener 120(1) is connected to the pipe, process manager 110 provides endpoint information 202 to listener 120(1). This operation is represented by an arrow 306 in FIG. 3. As previously described, this information identifies the application(s) that listener 120(1) is to listen for when receiving requests. This information also creates and enables associations between applications and application pools that allow listener 120(1) to identify an appropriate application pool for an application requested in a received request.

Listener 120(1) then "listens" for requests for which it can identify an application and an association of the application with an application pool. If the requested application is associated with an application pool for which listener 120(1) has already created a queue, then the request can be placed in that queue. On the other hand, if the request's application is associated with an application pool for which listener 120(1) has not yet created a queue, then the request can be categorized as one that "needs a new queue".

When listener 120(1) receives a request that needs a new queue (indicated by an arrow 308 in FIG. 3), listener 120(1) then starts a new internal queue such as queue 204(1), for example. In this embodiment, listener adapter 122(1) also signals process manager 110 to start a new queue in a worker process, as indicated by arrow 222 in FIG. 2. As previously described for one embodiment, the protocol of the request is "automatically" indicated by the listener in that each listener supports a particular protocol and has registered this protocol with process manager 110. Thus, process manager 110 knows the protocol of the request by the identity of the listener that starts the queue. This operation is represented by an arrow 310 in FIG. 3.

Process manager 110, in response to listener 120(1) starting a queue, launches a worker process (i.e., one of worker processes 114) corresponding to the application pool associated with the requested application. The worker process can include one or more applications. This operation is represented by an arrow 312 in FIG. 3.

After launching the worker process, process manager 110 in this embodiment also causes the worker process to start a queue for received requests and, in some scenarios, messages to be sent to listener 120(1) in handling the request. This operation is represented by an arrow 314 in FIG. 3. In some scenarios, a worker process may have more than one queue.

In this embodiment, the worker process launched in operation 314 also includes a protocol handler for each protocol needed to support the queue(s) started in that worker process. In one embodiment, starting the queue in the worker process causes the worker process to load a protocol handler corresponding to the protocol supported by listener 120(1).

With the protocol handler loaded, a connection between the worker process and listener 120(1) is established as indicated by an arrow or connection 224 in FIG. 2. As described below, requests in the protocol accepted by listener 120(1) can be routed to and handled by the worker process via connection 224. This operation of forming connection 224 is represented by an arrow 318 in FIG. 3.

In some embodiments, process manager 110 can configure listener 120(1) to request a start of a new queue when process manager 110 determines a new instance of a queue is needed or desirable (e.g., as part of a recycling operation to improve stability).

Listener 120(1) and the worker process can then exchange information. For example, listener 120(1) routes requests to the worker process via connection 224 (FIG. 2). In addition, information may also flow over connection 224 from the worker process to the client via listener 120(1). This operation is represented by an arrow 322 in FIG. 3. With listeners 120(2)-120(M) (see FIG. 1) configured to receive requests in other protocols, system 100 (FIG. 1) can advantageously service requests in multiple protocols.

Although a particular sequence of operations is describe above, in other embodiments the operations may be performed in other sequences, with some operations being performed multiple times, in different orders, and/or concurrently with other operations.

Figure 4:
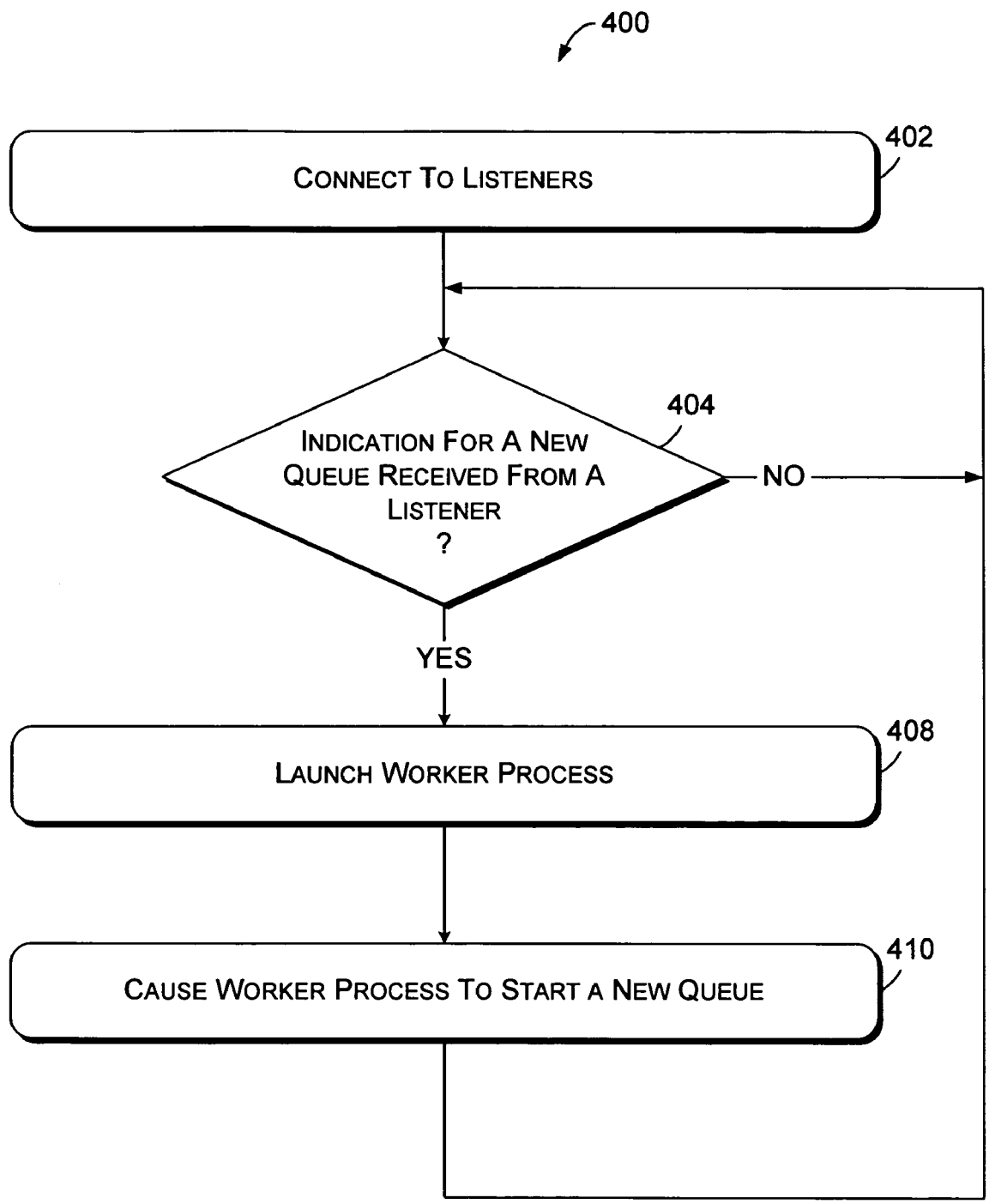
FIG. 4 is a flow diagram generally illustrating operational flow of a process manager in establishing a connection between a listener and a worker process, according to one embodiment.

FIG. 4 is a flow diagram generally illustrating a process 400 by which a process manager can establish a connection between a listener and a worker process, according to one embodiment. For example, in one embodiment, process 400 can be performed by process manager 110 to connect listener 120(1) to one of worker processes 114 as depicted in FIG. 2. However, in other embodiments, different process manager and/or listener implementations can be used in performing process 400.

At a block 402, a process manager connects to listeners. In one embodiment, one or more of the listeners can be implemented in a manner substantially similar to that of listener 120(1) (FIG. 2). Therefore, in one embodiment, the listeners can each connect to the process manager via a pipe published by the process manager, as described above for operation 304 (FIG. 3). One embodiment of block 402 is described in more detail below in conjunction with FIG. 5. In other embodiments, the listeners can connect with the process manager using different types of connections other than a pipe.

At a block 404, the process manager waits to receive an indication from a listener that a server request requires a new queue. Continuing the above example in which the listener is implemented like listener 120(1), the listener can determine whether a received server request needs a queue as described above for operation 310 (FIG. 3). In effect, the process manager waits until it receives an indication from a listener that a server request has been received that needs a new queue. If the process manager receives such an indication, operational flow proceeds to a block 408.

In one embodiment, the process manager can receive a request to start a queue (for an application or application pool) from the listener and, in response, determine if a queue already exists for that application or application pool. If such a queue does not exist, the operational flow proceeds to block 408. On the other hand, if a queue does exist for the application or application pool, operational flow proceeds to a block 412, which is described below.

At block 408, the process manager launches to a worker process. The worker process then connects to the listener that sent the indication (block 404). Continuing the above example, in one embodiment the listener starts a queue and the process manager launches the worker process and connects to the worker process as described above for operations 310 and 312 (FIG. 3). The worker process and the listener then form a connection as described above for operation 318. One embodiment of block 408 is described in more detail in conjunction with FIG. 6.

At a block 410, the process manager causes the worker process to start a new queue. Continuing the above example, the process manager can cause the worker process to start the new queue as described above for operation 314 (FIG. 3). In this way, the process manager need not be involved in the handling of the request. However, in some embodiments, the process manager may monitor the operation and start recovery operations if an error in the request handling should occur.

As previously mentioned for some embodiments, each listener supports receiving requests for a particular protocol. Thus, in those embodiments, the process manager will know the protocol of the server request by the identity of the listener that provided the indication in block 404. The process manager can then cause the worker process to be launched with an appropriate protocol handler for the listener.

Although process 400 is illustrated and described sequentially, in other embodiments, the operations described in the blocks may be performed in different orders, multiple times, and/or in parallel.

Figure 5:
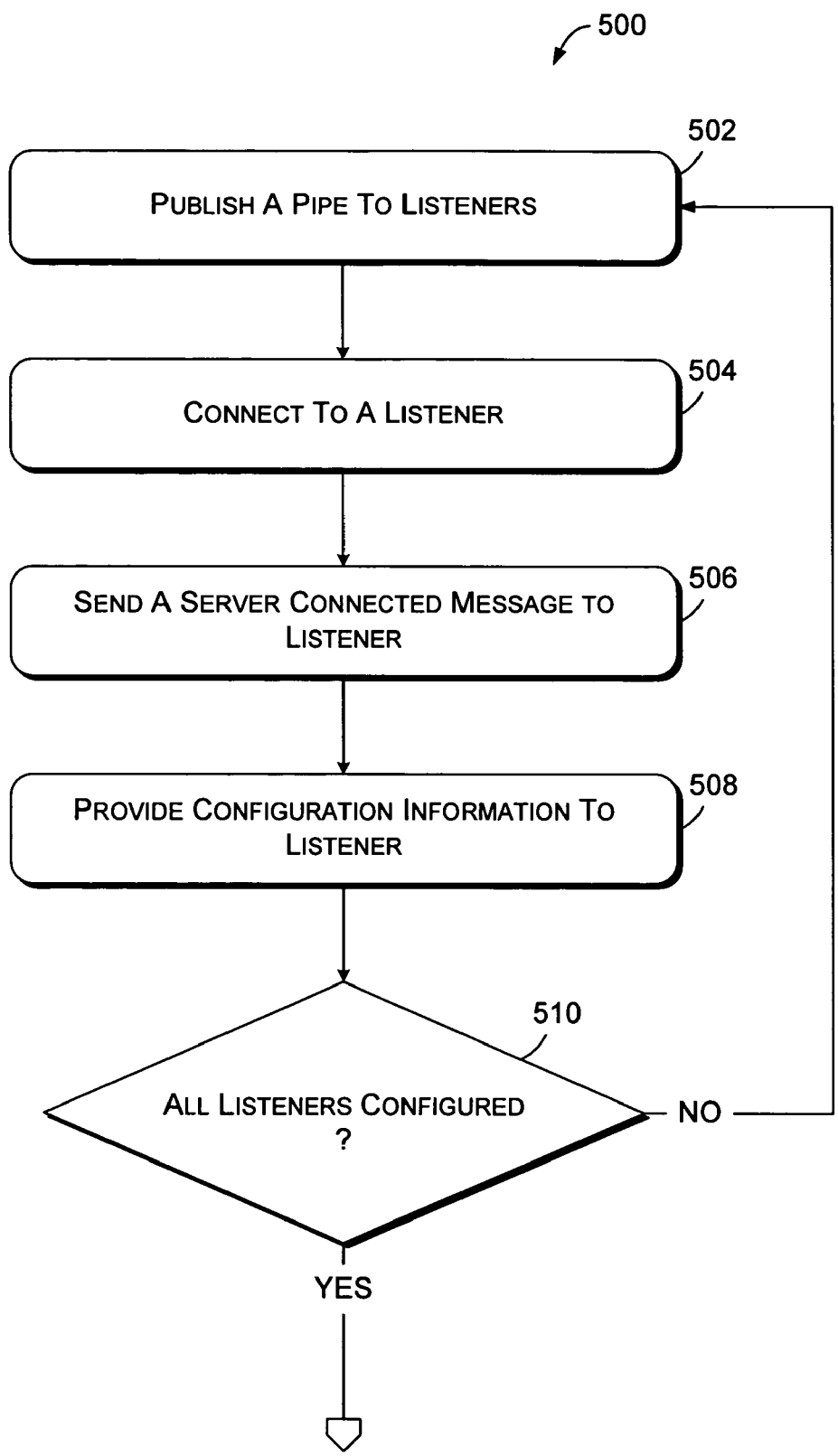
FIG. 5 is a flow diagram generally illustrating a process by which a process manager may connect to listeners, according to one embodiment.

FIG. 5 is a flow diagram generally illustrating a process 500 by which a process manager can establish connections with the listeners, according to one embodiment. This process can be used to implement block 402 of process 400 (FIG. 4). For example, in one embodiment, the process to form a connection between a process manager and a listener can be performed by process manager 110 and listener 120(1), as depicted in FIG. 2. However, different process manager and/or listener implementations can be used to perform the process in other embodiments.

At a block 502, the process manager provides an indication to the listeners that a connection is available. For example, the process manager and the listener can be respectively implemented using process manager 110 and listener 120(1) as described above in conjunction with FIG. 2. In one embodiment, during start-up of the server, the process manager publishes a pipe to connect with one of multiple listeners. All of the listeners that have not connected with the process manager during the start-up phase would attempt to connect with the pipe.

At a block 504, the process manager connects with one of the listeners. In one embodiment, the process manager will connect with the first listener to attempt to connect. In this embodiment, other attempts to connect to this published pipe will be rejected or ignored.

At a block 506, the process manager sends a "server connected" message to the connected listener. This message signals the listener that it is about to receive configuration information from the process manager.

At a block 508, the process manager loads configuration information into the listener. As previously described, this configuration information can include applications, application pools and their relationships to each other.

At a block 510, the process manager determines whether it has connected to all of the multiple listeners. If not, operational flow returns to block 502 to publish another pipe and connect to another listener. If all of the listeners have been connected, the operational flow for process 500 ends and proceeds to the next process (e.g., block 404 illustrated in FIG. 4).

Although process 500 is illustrated and described sequentially, in other embodiments, the operations described in the blocks may be performed in different orders, multiple times, and/or in parallel.

Figure 6:
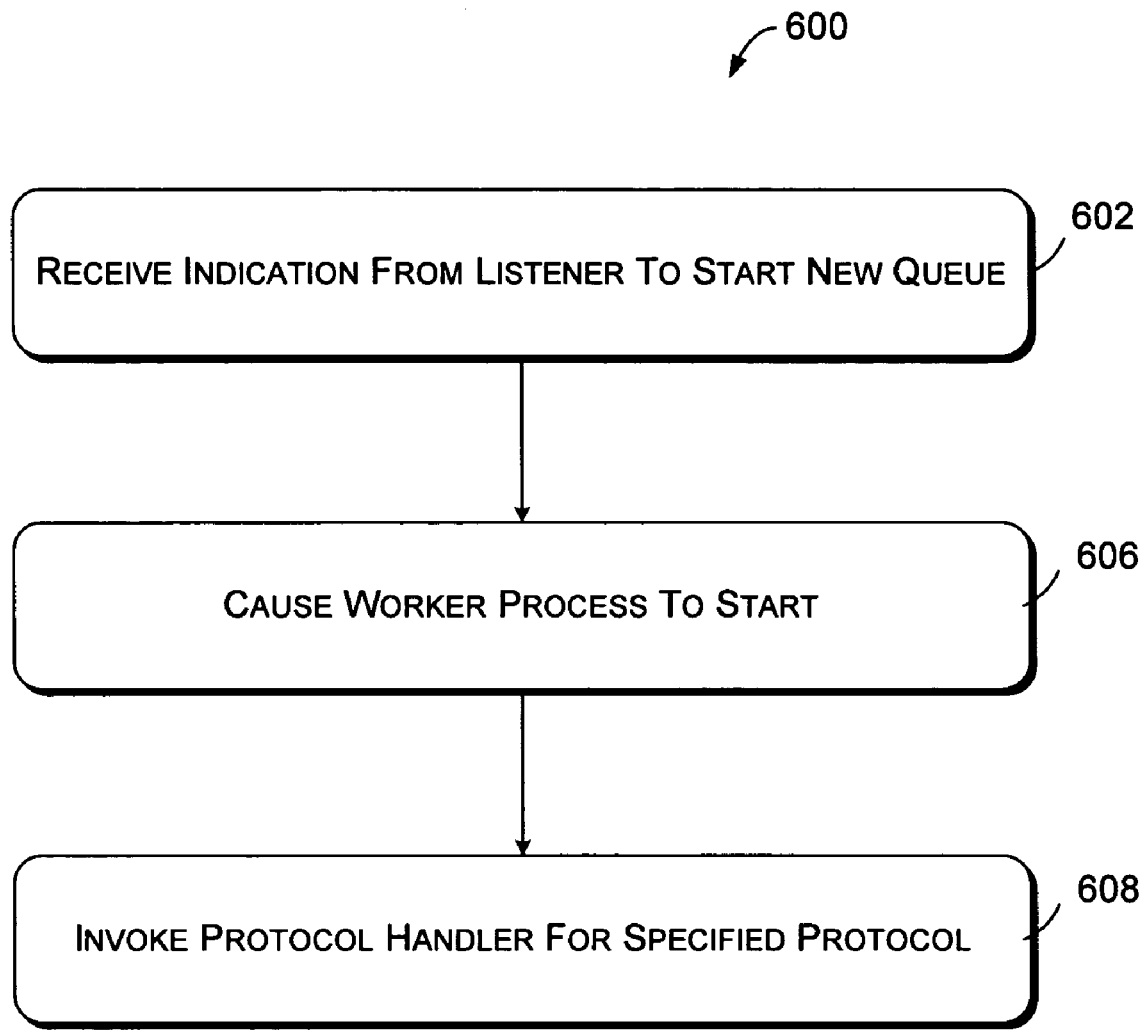
FIG. 6 is a flow diagram generally illustrating a process by which a process manager may launch a worker process, according to one embodiment.
Figure 7:
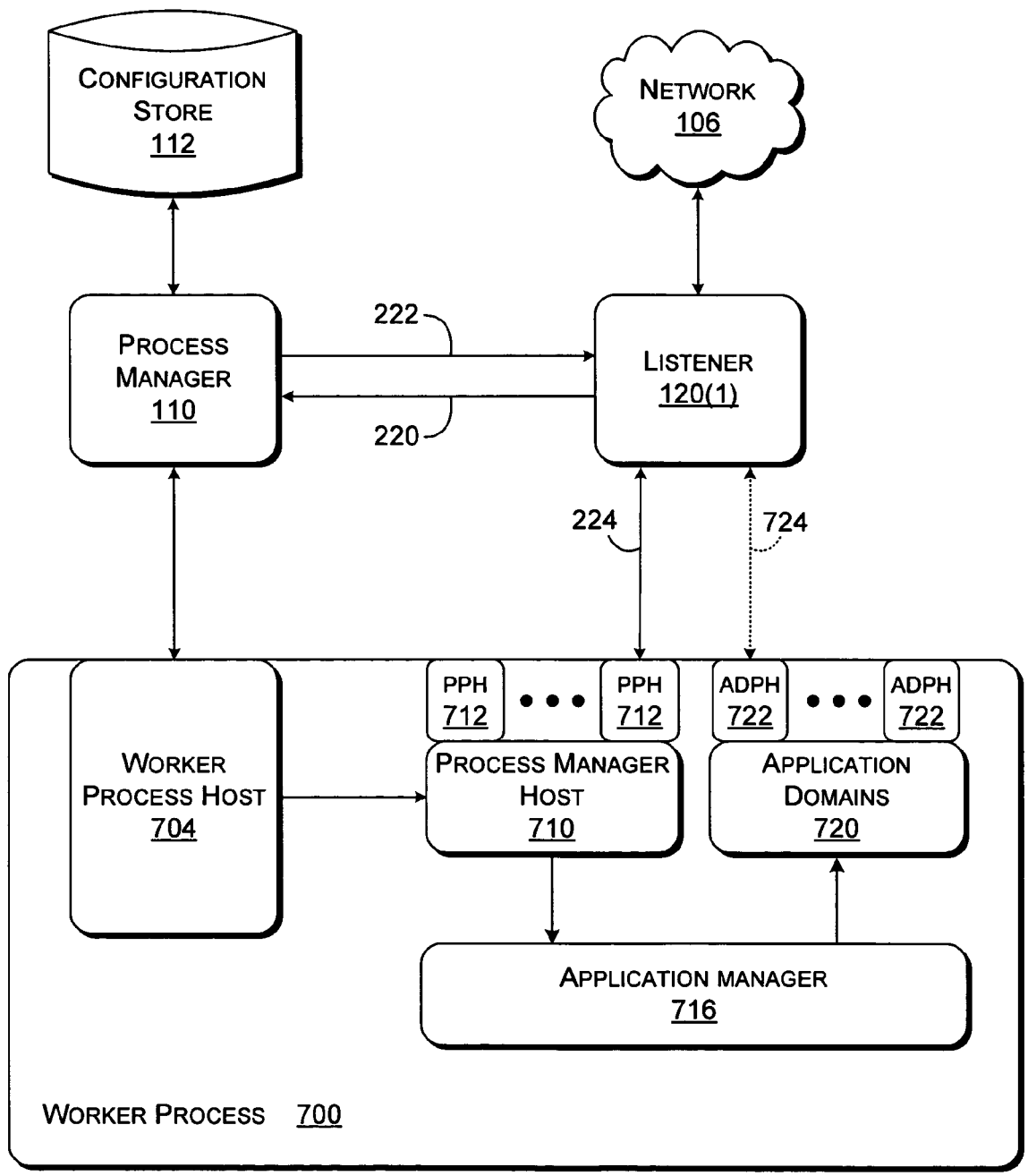
FIG. 7 is a functional block diagram generally illustrating a single worker process in more detail, according to one embodiment.

FIG. 6 is a flow diagram generally illustrating a process 600 by which a process manager can launch a worker process in response to receiving an indication from a listener for a new queue, according to one embodiment. For example, this process can be used to implement block 408 of process 400 (FIG. 4). In one embodiment, the process to launch a worker process can be performed by process manager 110 as depicted in FIG. 7 (described further below). However, different process manager implementations can be used to perform the process in other embodiments.

At a block 602, the process manager receives an indication from a listener to start a new queue corresponding to an application or application pool. In one embodiment, the listener makes a call on the process manager to perform a "start queue" method, which provides the process manager an indication to start a new queue for a particular application or application pool.

In a block 606, the process manager causes the worker process to start. In some embodiments, the process manager sends a start queue message to the worker process. For example, the process manager can call a start queue method of the worker process.

In a block 608, the process manager invokes a protocol handler for the specified protocol in worker process. In one embodiment, the process manager activates or makes a call to the appropriate protocol handler to support communication between the worker process and the listener.

Although process 600 is illustrated and described sequentially, in other embodiments, the operations described in the blocks may be performed in different orders, multiple times, and/or in parallel.

FIG. 7 generally illustrates a single worker process in more detail after being launched, according to one embodiment. In this embodiment, a worker process 700 includes a worker process host 704, a process manager host 710 having multiple process protocol handlers (PPHs) 712, an application manager 716, and one or more application domains 720 with multiple application domain protocol handlers (ADPHs) 722.

In one embodiment, worker process host 704 includes a component (not shown) to handle HTTP queues and another component to handle non-HTTP queues. The worker process host interfaces with the process manager (e.g., process manager 110 as described in conjunction with FIG. 2) and handles calls from the process manager that may have originated from the listeners (e.g., listener 120(1) as described in conjunction with FIG. 2). As previously described, listener 120(1) may make a call to process manager 110 to start a queue for a particular application or application pool. In making the call, listener 120(1) may pass a queue identifier, and an application (or application pool) identifier. Process manager 110 can pass this information to worker process host 704 so that it can be passed to process manager host 710 to use in invoking the PPH 712 appropriate for the protocol specified by the protocol identifier.

Process manager host 710, in one embodiment, manages the activities of worker process 700. For example, process manager host 710 manages the processes to start and stop queues, invokes PPHs 714 (as mentioned above), and manages application(s) that are running in worker process 700. Also, for example, information to be communicated between an application running in worker process 700 and listener 120(1) would be managed by process manager host 710 through one or more PPHs 712.

Application manager 716, in one embodiment, manages application domains that allow one or more applications to run in a worker process. For example, each application of an application pool can be loaded into a separate application domain of worker process 700 to maintain isolation between the applications. Application manager 716 also supports communication between the application domains and process manager host 710.

ADPHs 722, in one embodiment, support communication in the specified protocol between application domains 720 and a listener. For example, an ADPH 722 supports communication between listener 120(1) and application domains 720. This connection is optionally established, as indicated by dashed line 724. For example, a request for a new queue corresponding to an application would cause worker process 700 to invoke an ADPH of ADPHs 722 to receive requests directly into the application domain from the listener.

Illustrative Operating Environment

The various embodiments described above may be implemented in computer environments of server 102 and clients 104(1)-104(N) of system 100 (FIG. 1). An example computer environment suitable for use in the server and/or clients is described below in conjunction with FIG. 8.

Figure 8:
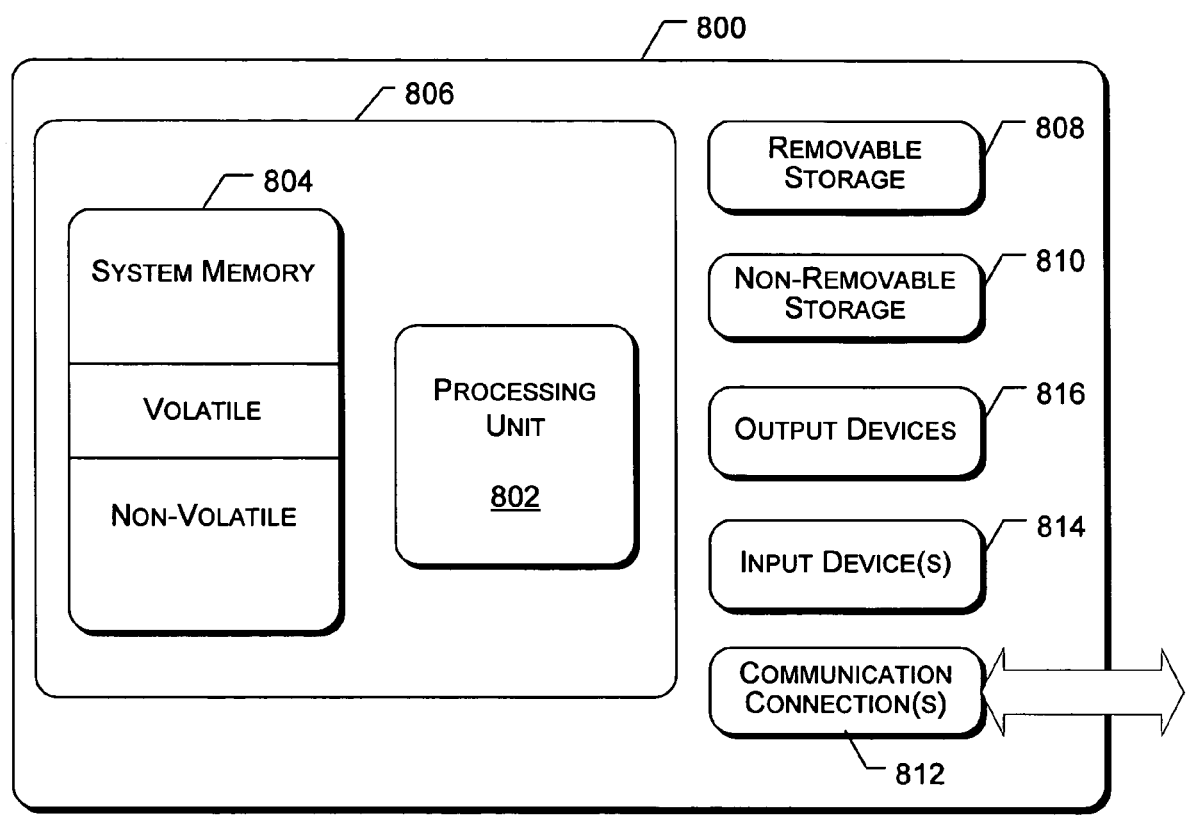
FIG. 8 is a functional block diagram generally showing an illustrative computing environment in which various embodiments of the techniques and mechanisms described herein may be implemented.

FIG. 8 illustrates an exemplary system for implementing embodiments of the invention. The environment includes a computing device, such as computing device 800. In a basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, computing device 800 may also have additional features/functionality. For example, computing device 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications connection(s) 812 that allow the device to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 800 may also have input device(s) 814 such as keyboard, mouse, pen, voice input device, touch input device, etc. Output device(s) 816 such as a display, speakers, printer, etc. may also be included. All these devices are well know in the art and need not be discussed at length here.

Computing device 800 may include a variety of computer readable media. Computer readable media can be any available media that can be accessed by computing device 800 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing device 800. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for forming a connection between a listener and a worker process in a server using a process manager in the server, the method comprising:

receiving, at the process manager, an indication from the listener to start a queue that is to be used in handling a server request from a client, the indication also specifying the listener's identity, the server request conforming to a protocol of a plurality of protocols, the indication further specifying a protocol to be used in handling the server request, wherein the server can handle server requests in the plurality of protocols;

launching the worker process, wherein the worker process and the listener form the connection to support communication between the server and the client using the specified protocol;

publishing a pipe that is to be used by the process manager in receiving information from the listener; and causing, by the process manager, the worker process to start a queue, in response to the process manager publishing a pipe, that is to be used in handling client requests received from the listener.

2. The method of claim 1, further comprising configuring the listener to start a new queue, wherein the new queue is to be started in response to a request, from a client, that requires a new queue.

3. The method of claim 1, further comprising providing configuration to the listener, wherein the configuration information includes information associating applications and application pools.

4. The method of claim 3, wherein the configuration information is obtained from a configuration store.

5. The method of claim 1, further comprising invoking protocol handler in the worker process, wherein the protocol handler is to support communication according to the server request's protocol.

6. The method of claim 5, wherein invoking a protocol handler comprises invoking a protocol handler corresponding to an application pool.

7. The method of claim 5, wherein invoking a protocol handler comprises invoking a protocol handler corresponding to an application.

8. The method of claim 5, further comprising selectively disabling an application or application pool in a listener.

9. The method of claim 1, further comprising creating in the listener at least one queue to handle requests from the client, the at least one queue being created by the listener.

10. An apparatus for forming a connection between a listener and a worker process in a server, the apparatus comprising:

computer storage medium having stored thereon:

means for receiving an indication from the listener to start a queue that is to be used in handling a server request from a client, the indication also specifying the listener's identity, the server request conforming to a protocol of a plurality of protocols, the indication further specifying a protocol to be used in handling the server request, wherein the server can handle server requests in the plurality of protocols;

means for launching the worker process, wherein the worker process and the listener form the connection to support communication between the server and the client using the specified protocol;

means for publishing a pipe that is to be used for receiving information from the listener; and means for causing the worker process to start a queue, in response to the process manager publishing a pipe, that is to be used in handling client requests received from the listener.

11. The apparatus of claim 10, further comprising means for configuring the listener to start a new queue, wherein the new queue is to be started in response to a request, from a client, that requires a new queue.

12. The apparatus of claim 10, further comprising means for providing configuration information to the listener, wherein the configuration information includes information associating applications and application pools.

13. The apparatus of claim 12, wherein the means for providing configuration information obtains the configuration information from a configuration store.

14. The apparatus of claim 10, further comprising means for invoking protocol handler in the worker process, wherein the protocol handler is to support communication according to the server request's protocol.

15. The apparatus of claim 14, wherein the means for invoking a protocol handler is to invoke a protocol handler corresponding to an application pool.

16. The apparatus of claim 14, wherein the means for invoking a protocol handler is to invoke a protocol handler corresponding to an application.

17. The apparatus of claim 10, where the listener creates at least one internal queue in response to the server request from the client.

18. A system, comprising:

a plurality of clients;

a network coupled to the plurality of clients; and a server, coupled to the network, the server including a process manager, and a plurality of listeners, wherein the process manager is configured to:

form a connection to the listener;

receive an indication from the listener to start a queue that is to be used in handling a server request conforming to a protocol of a plurality of supported protocols, the indication also specifying the listener's identity, the indication further specifying a protocol of a plurality of supported protocols to be used in handling the server request;

launching a worker process to handle the server request and to support communication between the server and one of the plurality of clients using the specified protocol;

publish a pipe that is to be used by the process manager in receiving information from a listener of the plurality of listeners; and cause the worker process to start a queue, in response to the process manager publishing a pipe, that is to be used in handling client requests received from the listener.

19. The system of claim 18, wherein the process manager is further to configure the listener to start a new queue, wherein the new queue is to be started in response to a request, from a client, that requires processing.

20. The system of claim 18, wherein the process manager is further to provide configuration information to the listener, wherein the configuration information includes information associating applications and application pools.

21. The system of claim 20, wherein the configuration information is obtained from a configuration store.

22. The system of claim 18, further comprising invoking protocol handler in the worker process, wherein the protocol handler is to support communication according to the server request's protocol.

23. The system of claim 22, wherein invoking a protocol handler comprises invoking a protocol handler corresponding to an application.

24. The system of claim 22, wherein invoking a protocol handler comprises invoking a protocol handler corresponding to an application domain.

* * * * *